Aug. 4, 1970  H. F. TUTTLE  3,522,582
THROTTLE-ACTUATED FLASHING SIGNAL LIGHTS
Filed April 10, 1969
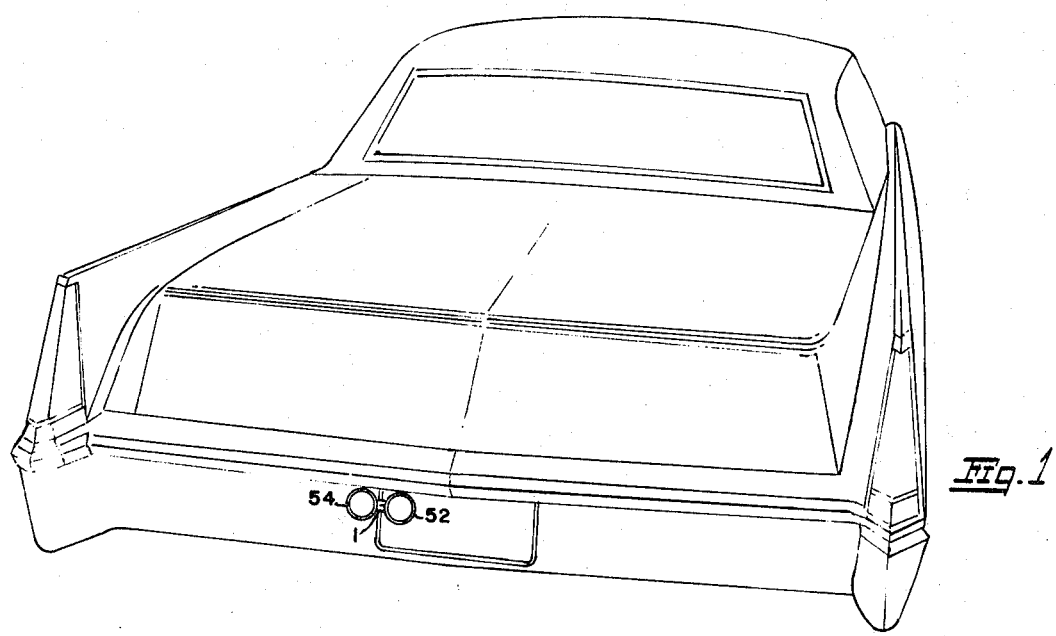
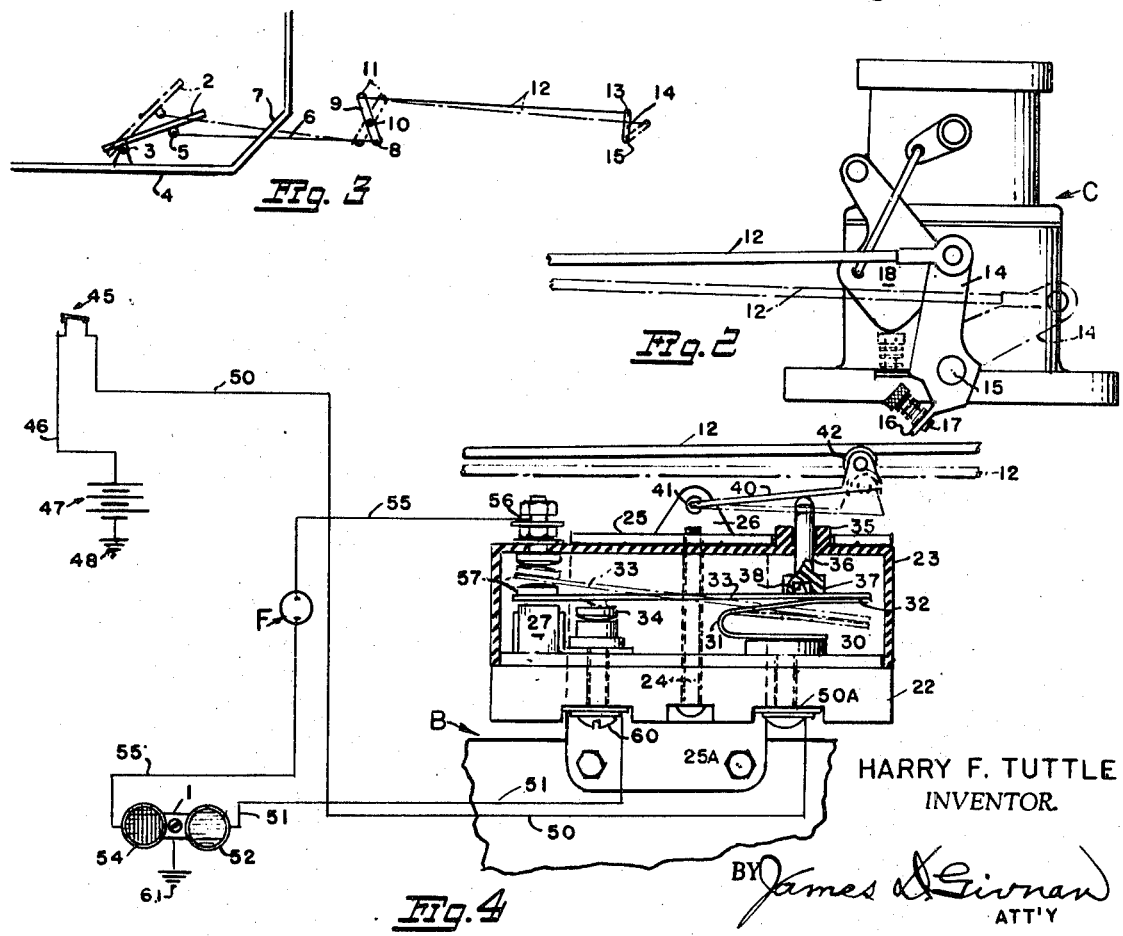
HARRY F. TUTTLE
INVENTOR.
BY James D. Givnan
ATT'Y

United States Patent Office 3,522,582
Patented Aug. 4, 1970

3,522,582
THROTTLE-ACTUATED FLASHING
SIGNAL LIGHTS
Harry F. Tuttle, 4806 SE. 16th Ave.,
Portland, Oreg. 97202
Filed Apr. 10, 1969, Ser. No. 815,022
Int. Cl. B60q 1/00, 3/00
U.S. Cl. 340—72                         1 Claim

ABSTRACT OF THE DISCLOSURE

Throttle-actuated signal lights of contrasting colors mounted on an automotive vehicle and automatically operated by the foot throttle to indicate to a following vehicle any change from speed of travel to idling speed. The lights are of contrasting colors such, for example, as amber and blue, with the amber light in circuit through a flasher with the vehicle's ignition switch and thereby energized at any time and during closure of the switch. The blue light is automatically and steadily energized only during acceleration of the vehicle by throttle movement.

---

The objects of the invention are:

To provide signal lights and automatic alternate operating means therefor as above described which are of simple, efficient, durable and inexpensive construction, readily adaptable for attachment to any part of the vehicle engine or its related parts close to the engine carburetor and connected by simple linkage to the foot throttle.

To provide signal lights which can only be operated when the ignition switch of the vehicle is closed and therefore automatically rendered inoperable when the ignition switch is open.

The foregoing and other objects and advantages which will become subsequently apparent reside in the details of construction and operation as more fully hereinafter described and claimed, reference being had to the accompanying drawing forming a part hereof and in which:

FIG. 1 is a rear elevational view, for illustrative purposes only, showing signal lights made in accordance with my invention and mounted to the vehicle below the rear bumper.

FIG. 2 is a fragmentary outline of a conventional carburetor and control lever linked in accordance with my invention to the throttle or accelerator pedal of a vehicle.

FIG. 3 is a diagrammatic view of the foot throttle and linkage to the carburetor control valve.

FIG. 4 is a longitudinal side elevational view of a switching mechanism partly in section and showing the carburetor operating lever associated with the switch and including the signal lights in electric circuitry therewith.

Referring now more particularly to the drawing wherein like reference numerals designate like parts, numeral 1 indicates a mounting bracket for colored signal lights in accordance with my invention and preferably, though not restrictively, mounted below the rear bumper of a vehicle.

In FIG. 3 a conventional foot throttle 2 is hingedly mounted at its bottom end as at 3 to the floorboard 4 of the vehicle. The throttle 2 is connected intermediate its ends as at 5 to one end of a control rod 6 which extends through a bulkhead or fire wall 7 and connected at its opposite end as at 8 to the bottom end of a lever 9 pivotally attached as at 10 to any adjacent part or stationary component of the vehicle's engine (not shown) an connected at its top end 11 to one end of a push-pull rod 12 whose opposite end is connected as at 13 to the top end of a control lever 14 for the carburetor indicated generally at C.

Lever 14 is pivoted as at 15 in the usual manner to the carburetor and extends therebelow where it is provided with an outwardly extending arm 16 provided with an adjusting screw 17 for contact with an idling cam 18, all in the conventional manner.

From the foregoing and with particular reference to FIG. 3 it will be apparent that forward downward movement of the foot throttle 2 will impart forward movement to the rod 6 and through the medium of the lever 9 impart a reverse or rearward movement of the carburetor control rod 12. Such movement of rod 12 will, of course, move the actuating lever 14 in a counter-clockwise arcuate direction to thereby lift the arm and move it rearwardly as indicated by broken lines.

The switching mechanism illustrated in FIG. 4 comprises a base 22 and a cover or housing 23 both of dielectric material and secured together by screw fasteners 24 extending upwardly through the base 22, through the top of the housing 23 into threaded engagement with a plate 25 provided with bearing brackets 26.

Secured to the base 22 near one end thereof is a permanent magnet 27. Also extending upwardly from the base is one contact 50A terminating in a metallic support 30 for one end of a leaf spring 31 bent back on itself as shown with its free end secured as at 32 in any suitable manner to one end of a contact arm 33 whose opposite end is provided with first and second movable contacts 34 and 57 normally held in the full line position shown by the magnetic field of the permanent magnet 27.

Molded integral with the top of the switch housing 23 is a slide bearing 35 for a plunger 36 enlarged at its bottom end into an inverted cup shape 37 surrounding a centering pin or nodule 38 carried by the switch arm 33. The top end of plunger 36 is at all times held by the spring 31 and arm 33 in contact with the underside of an actuating arm 40 hingedly attached at its inner end as at 41 to the bearing bracket 26 and provided at its outer end with a grooved roller 42 which, through the medium of the spring 31 and plunger 36, is at all times in rolling contact with the link 12.

The circuitry as illustrated in the wiring diagram of FIG. 4 includes an ignition switch 45 whose one side is connected by wire 46 to one side of the vehicle battery 47 which is grounded as at 48. The other side of switch 45 is connected by conductor 50 to the switch contact 50A and therethrough to the leaf spring 31 and through switch arm 33, first movable contact 34 and conductor 51 to one side of signal lamp 52, which burns steadily when the ignition switch is closed and the vehicle is being power driven. The other side of the blinker lamp 52 is electrically connected by bracket 1 to one side of a companion light 54 whose opposite side is connected by wire 55 and a flasher F to a fixed contact 56 carried by the top of the switch housing 23. The second movable contact 57 is carried by the outermost free end of switch arm 33 which is normally held down by the magnet 27.

From the foregoing it will be apparent that when the ignition switch 45 is closed the blue signal light 52 will be energized by uninterrupted current flow from one side of battery 47 through conductor 50, fixed contact 50A, spring 31, switch arm 33, first movable contact 34, a fixed contact 60 and conductor 51 to one side of the blue light 52 whose opposite side is grounded as at 61.

With reference to FIGS. 2 and 3, it will be seen that energization of the blue light 52 will occur at any time during engine acceleration by forward movement of the foot throttle 2 and rearward movement of the rod 12 caused by the rearward swing of carburetor control lever 14, all as indicated by broken lines. Such upward movement of the link 12 will be followed by the plunger 36 which will release compression of the spring 31 to allow the switch arm 33 to be pulled downwardly by the magnet 27 to close the circuit through contacts 34 and 60 and wire 51 to one side of the light 52 and from its grounded side 61 back to the other side of the battery 47.

Deceleration of the vehicle engine by reverse or forward swing of the carburetor actuating lever 14 will, through the medium of the roller 42 and arm 40, depress the plunger 36 and spring 31 to force the opposite end of the switch arm upwardly to break the circuit through contacts 34 and 60 to make contact with the fixed contact 56 and from there through wire 55, a flasher F to one side of the blinking amber light 54, and from its grounded side back to the battery. Thus the driver of a following vehicle will be cautioned by intermittent illumination of the amber light 54 that the vehicle ahead has slowed to an idling speed.

Although the circuitry shown in FIG. 4 includes only the signal lights, battery, and switching mechanism, it will be readily understod that such circuitry also includes or is a part of the entire electrical system for a vehicle.

As illustrated in FIG. 4, the switch base and its housing 22–23 are carried by the mounting plate 25 whose bottom end may be secured by bolts 25A or the like to an engine block or to any other fixed structural component as indicated fragmentarily at B.

What I claim is:

1. In a vehicle driven by an engine controlled by a foot throtttle and alever-actuated carburetor wherein said lever is pivotally attached at its bottom and to the carburetor and its top end swingable upwardly and rearwardly in an arcuate path from an engine-decelerating position to an engine accelerating position, the improvement comprising a rocker arm in the form of a lever pivotally attached intermediate its ends to a stationary component of the vehicle disposed between the carburetor and the foot throttle, a first rod interconnecting the top end of said carburetor actuating lever and the top end of said rocker arm, a second rod interconnecting the bottom end of said rocker arm and said foot throttle whereby forward and downward movement of said throttle will impart through said rocker arm rearward and upward movement of said first rod by corresponding movement of said caburetor actuating lever, signal lights of contrasting colors mounted to the vehicle and in circuitry with a source of electric current carried by the vehicle, said circuitry including an engine ignition switch in circuit with one side of said current source whose other side is grounded, the other side of said ignition switch connected to a second switch and to a switch arm therein spring-biased upwardly at one of its ends, first and second movable contacts carried by the free end of said switch arm, magnetic means subjacent the free end of said switch arm normally holding said first movable contact in contact with one side of one of said signal lights and therethrough to a ground connection, a fixed contact in circuit through a flasher with one side of the other of said signal lights and therethrough to a ground connection, a plunger at all times bearing against said spring-biased end of said switch arm and extending thereabove, said plunger operable by an actuating arm hingedly attached at one of its ends with its free end at all times in contact with said first rod, whereby said foot throttle, upon upward decelerating movement, will through said second rod, rocker arm, and the forward and downward movement imparted to the first rod by said carburetor actuating lever, actuate said plunger to depress the adjacent end of said switch arm and elevate the oposite end thereof to break the circuit through said first movable contact and close the circiut through said second fixed contact and through said flasher to said second signal light.

References Cited

UNITED STATES PATENTS 2,760,113  8/1956  Danek _____ 340—71 X

HAROLD I. PITTS, Primary Examiner

U.S. Cl. X.R.

340—71, 87, 110